United States Patent [19]
Takida et al.

[11] 3,852,920
[45] Dec. 10, 1974

[54] MACHINE TOOL HAVING REST APPARATUS

[75] Inventors: Masami Takida, Kariya; Isao Suzuki, Okazaki; Masahisa Osuga, Gamagori; Takeshi Ota, Aichi, all of Japan

[73] Assignee: Toyoda Koki Kabushiki Kaisha, Kariya-shi, Aichi-ken, Japan

[22] Filed: Nov. 19, 1973

[21] Appl. No.: 416,768

[30] Foreign Application Priority Data
Nov. 29, 1972 Japan.............................. 47-119690

[52] U.S. Cl............. 51/105 R, 51/165.91, 90/15 R
[51] Int. Cl............................................ B24b 49/04
[58] Field of Search......... 51/103 R, 105 SP, 165 R, 51/165.91; 90/15 R

[56] References Cited
UNITED STATES PATENTS
2,638,719  5/1953  Balsiger...................... 51/165.91 X
3,153,884  10/1964  Balsiger...................... 51/105 SP X Primary Examiner—Harold D. Whitehead
Attorney, Agent, or Firm—Wenderoth, Lind & Ponack

[57] ABSTRACT

A grinding machine having means to momentarily stop the in-feed movement of the grinder toward a rotably supported workpiece. The diameter of the workpiece is determined by a sizing device after the momentary stop of the tool and stored in a memory. Subsequently the engaging pieces of a work rest cause the workpiece to be deflected toward the tool for continued machining and both the tool and rest are subjected to synchronized advance when the output from the sizing device reaches a preselected value greater than the stored value in the memory.

10 Claims, 5 Drawing Figures

MACHINE TOOL HAVING REST APPARATUS

BACKGROUND OF THE INVENTION

The invention relates to a machine tool having a rest apparatus, and aims to provide such machine tool in which a measurement is made on a difference in the diameter of the workpiece before and after the latter is forced inward or toward the tool by engaging pieces on the rest apparatus so as to initiate the synchronized in-feed of both of the tool and the engaging pieces toward the workpiece when the above difference in the diameter of the workpiece or the amount of shift by which the workpiece is forced by the engaging pieces toward the tool becomes equal to a preset value.

Heretofore, when machining a workpiece supported by a rest apparatus, the engaging pieces of the apparatus are advanced toward the workpiece at a given rate slightly greater than the advance speed of the tool when the tool has moved to a given position so that the machining by the tool can be continued while holding the workpiece against the engaging pieces. However, this causes the amount of shift to be decreased when the engaging pieces become abraded, causing an improper support of the workpiece and resulting in an undesirable degradation in the machining accuracy.

SUMMARY OF THE INVENTION

In view of the foregoing, the invention proposes an improved machine tool having a rest apparatus in which a tool adapted to be advanced toward a rotatably supported workpiece for machining thereof is momentarily stopped in the course of the in-feed movement thereof, and the diameter of the workpiece is determined by a sizing device immediately after the momentary stop of the tool and stored in a memory. Subsequently the engaging pieces cause the workpiece to be deflected toward the tool for continued machining, and both the tool and the engaging piece are subjected to synchronized advanced when the output from the sizing device becomes to a preselected value greater than the stored value in the memory. In this manner, the amount of shift, or the amount by which the workpiece is caused by the engaging members to be deflected toward the tool can be maintained constant to assure a high precision machining independently of wear which the engaging pieces might suffer.

DETAILED DESCRIPTION OF THE INVENTION

Figure 1:
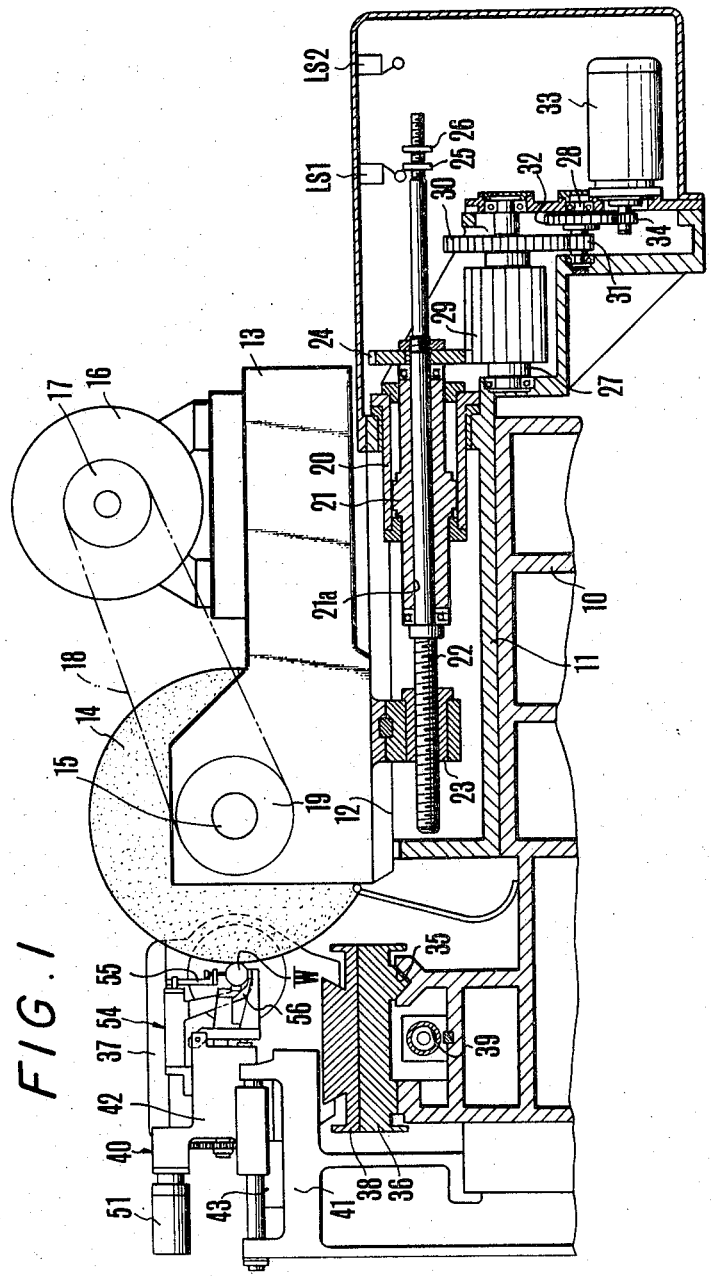
FIG. 1 is a side elevation view, partly in section, of a machine tool having a rest apparatus constructed in accordance with the present invention.

Referring to the drawings, an embodiment of the present invention will be specifically described below. FIG. 1 shows a machine tool having a bed 10 on which placed is a stationary base 11 having guide ways 12 formed on its upper surface on which guide ways a wheel slide 13 (or tool slide) is slidably mounted. A grinding wheel 14 (or tool) is mounted on a spindle 15 which is rotatably carried by the wheel slide 13 and which is driven from a drive motor 16 carried on the latter through a belt 18 that extends around a pulley 17 on the motor shaft and another pulley 19 on the grinding wheel spindle 15. A rapid feed cylinder 20 is fixedly mounted in the stationary base 11 and a piston 21 is slidably provided in the cylinder 20. The piston 21 has a bore 21a extending therethrough in which a feed screw 22 is disposed rotatably, but is constrained in its axial movement. The feed screw 22 threadably engages at its one end with a nut 23 depending from the bottom surface of the wheel slide 13, and has a gear 24 secured to its other end which projects outwardly of the piston 21. At this end and beyond the gear 24, the feed screw 22 is provided with a pair of dogs 25 and 26 which are adapted to operate a pair of limit switches LS1 and LS2, respectively, which recognize the forward and rearward ends of a rapid feed, respectively. Rotatably mounted on the rear part of the stationary base 11 are a pair of shafts 27 and 28 carrying a spur gear 29 and gears 30, 31 and 32, which together constitute a reduction gearing. The gear 32 engages with a gear 34 on the shaft of a pulse motor 33, while the gear 24 maintains a meshing engagement with the spur gear 29 to permit a relative movement therebetween in a rapid feed stroke. The feed screw 22, nut 23, gears 29 to 32 and the pulse motor 33 constitute an in-feed mechanism for the wheel slide 13.

The bed 10 is formed with guide ways 35 which extends in a direction perpendicular to the guideways 12 and in which a traverse table 36 is slidably mountd. The traverse table 36 carries a swivel table 38 on which are mounted a headstock 37 and a tailstock, not shown. The traverse table 36 is movable by means of a hydraulic drive from a cylinder 39 fixedly mounted on the bed 10. It is to be noted that the workpiece on the machine tool is driven by an electric motor (not shown) provided on the head-stock.

Figure 2:
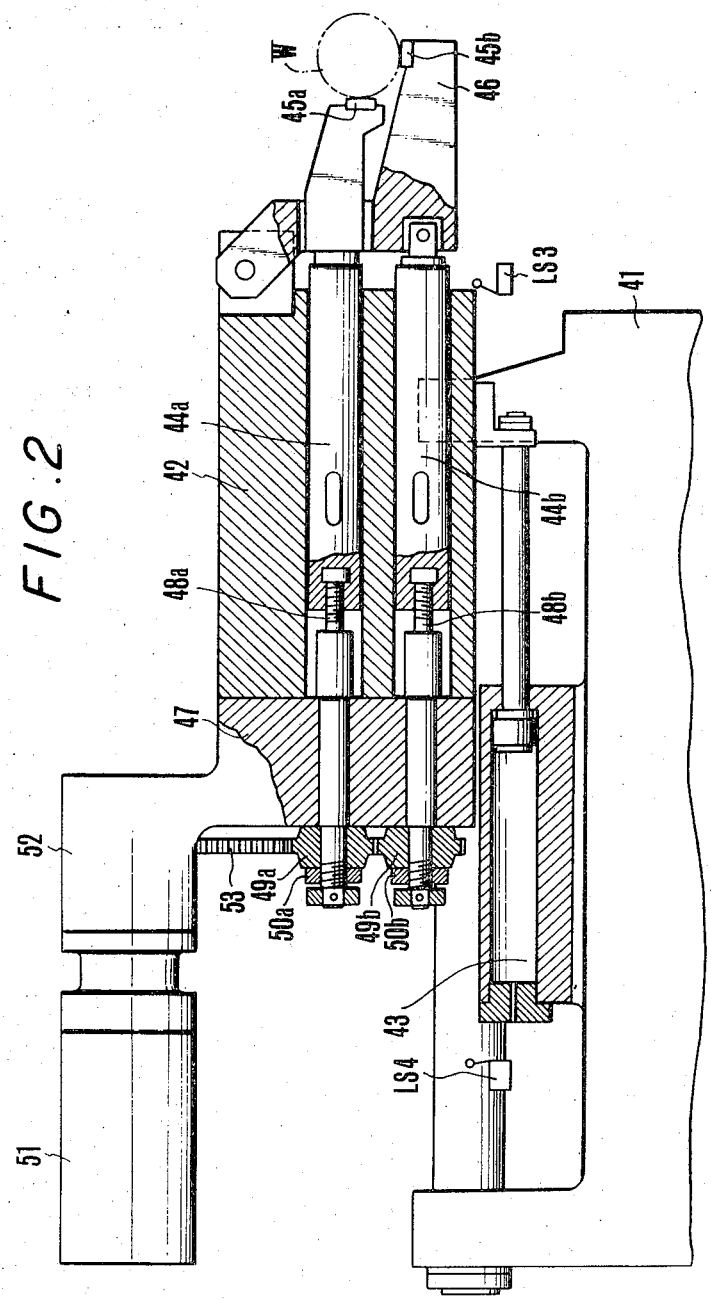
FIG. 2 is a side elevation view, partly in section, of the rest apparatus.

The rest apparatus 40 comprises a base 41 which is secured on the bed 10 at the opposite side of a workpiece W from the wheel slide 13 and on which a rest body 42 is placed so as to be able to be moved toward and away from the workpiece W by means of a cylinder 43 mounted on the base 41, the body 42 operating a limit switch LS3 at the end of its advancing movement and a limit switch LS4 at the end of its retracting movement. As indicated in FIG. 2, a pair of sliding rods 44a and 44b are irrotationally fitted into corresponding bores in the body 42, and an engaging piece 45a which supports the workpiece W horizontally is secured to the extremity of the upper sliding rod 44a while the extremity of the lower sliding rod 44b is connected with an L-shaped arm 46 at its bend, the arm 46 being pivotally mounted on the front portion of the body 42. Another engaging piece 45b is secured to the forward end of the arm 46 and is adapted to be moved upward.

An apparatus for moving the engaging pieces 45a and 45b toward and away from the workpiece W will now be described. The sliding rods 44a and 44b are formed with female screws which are engaged with thread portions of a pair of shafts 48a and 48b, respectively, which are journaled in a bracket 47 fixedly secured to the rear end of the body 42, the threads on the threaded portions of the shafts 48a and 48b being formed in opposite helix directions with each other. A pair of gears 49a and 49b are fixedly mounted on the rear end of the respective shafts 48a and 48b by means of nuts 50a and 50b, respectively, the gears 49a and 49b engaging with each other. A stepping motor 51 is fixedly mounted on the bracket 47 and is connected with a reduction gearing unit 52 thereon which has an output gears 53 which meshes with the gear 49a on the shaft 48a and thus engages in turn with the gear 49b on the shaft 48b. Thus the rotation of the stepping motor 51 is effective to drive the shafts 48a and 48b in opposite directions in a synchronized manner, and because the threads on the sliding rods 44a and 48b are in opposite directions to each other, the latter are moved toward and away from the workpiece W in a synchronized manner. Toward the end of the advancing movement of the body 42, the engaging pieces 45a and 45b move toward the axis of the workpiece W in the horizontal direction and from below it, respectively.

An automatic sizing device 54 depends from the forward end of the rest body 42, and includes a pair of upper and lower feelers 55 and 56 which are adapted to bear against the outer periphery of the workpiece W when the body 42 has reached the end of its advancing movement. These feelers are arranged and connected to operate a differential transformer, not shown, which is adapted to produce an output voltage proportional to the diameter of the workpiece W.

Figure 3:
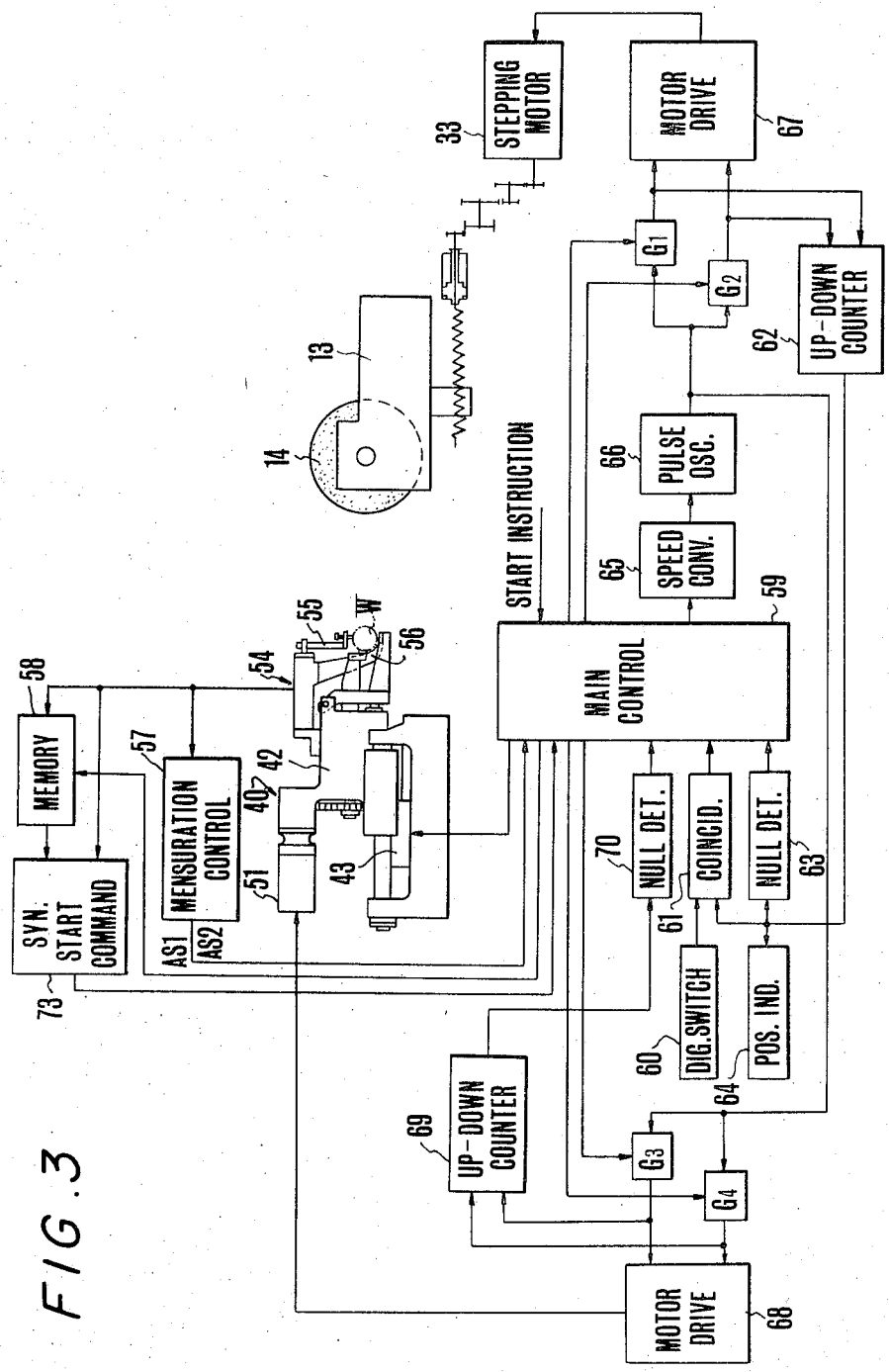
FIG. 3 is a block diagram of a control system.

As shown in FIG. 3, the sizing device 54 is connected with a mensuration control circuit 57 and a memory circuit 58, and the mensuration control circuit 57 is adapted to produce a fine grinding signal AS1 when the workpiece W is machined to size leaving a dimension or depth to be finished in a finish grinding stroke, and to produce a size complete signal AS2 when the workpiece W is finished to size, these signals being outputted to a main control circuit 59.

Figure 4:
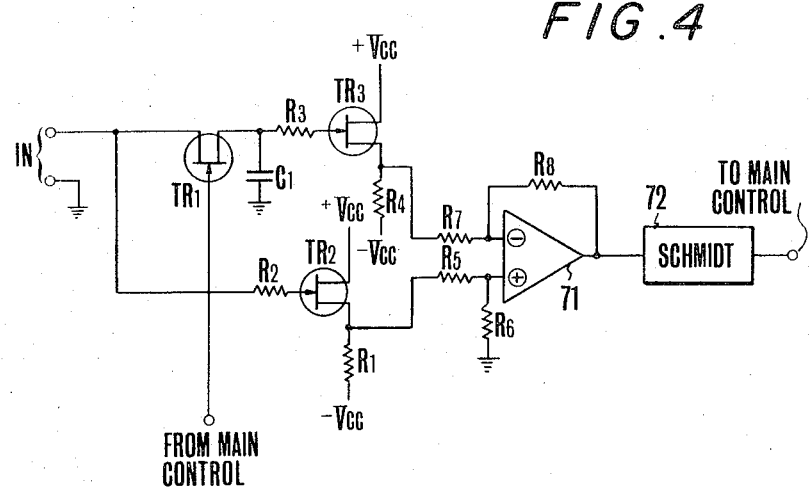
FIG. 4 is a circuit diagram of a memory circuit and a synchronized start command circuit.

Specifically, referring to FIG. 4, the output from the sizing device 54 is applied to the source terminal of a field effect transistor TR1, and also to the gate terminal of another field effect transistor TR2 through a resistor R2, the latter transistor having its source terminal connected with a positive terminal of a voltage supply +Vcc and its drain terminal connected with the negative terminal of the voltage supply −Vcc through an output resistor R1. In this manner, a voltage output proportional to the output from the sizing device 54 is derived from the drain terminal of the transistor TR2 and is applied through a resistor R5 to a positive input terminal of a differential amplifier 71. The positive input terminal is also connected with the ground through a resistor R6. The transistor TR1 conducts only when a pulse signal is applied to its gate terminal to pass the output from the sizing device 54 to charge a capacitor C1 connected with the drain terminal thereof. The capacitor C1 is in turn connected through an input resistor R3 with the gate terminal of a field effect transistor TR3 having a very high input impedance. The transistor TR3 has its source terminal connected with the positive terminal of the voltage supply +Vcc and its drain terminal connected with the negative terminal of the voltage supply −Vcc through an output resistor R4. An output voltage proportional to the voltage developed across the capacitor C1 is derived from the drain terminal of the transistor TR3 and is applied through a resistor R7 to a negative input terminal of the differential amplifier 71. The differential amplifier 71 is arranged such that the ratio of its input resistance R5 to the ground resistance R6 is equal to the ratio of its input resistance R7 to a feedback resistance R8 so as to produce a voltage as its output terminal which is proportional to a difference between the voltages outputted by the transistors TR2 and TR3. A Schmidt circuit 72 is connected with the output terminal of the differential amplifier 71 and produces a signal, when the aforementioned difference in voltages has become equal to a preset value, to the main control circuit 59 in order to initiate the synchronized advance of the wheel slide 13 and the engaging pieces 45a, 45b of the rest apparatus 40 toward the workpiece W. The field effect transistor TR1 and the capacitor C1 constitute together the memory circuit 58 for storing the output from the sizing device 54, while a synchronized start command circuit 73 for instructing a synchronized advance of the wheel slide 13 and the engaging pieces 45a, 45b is formed by the transistors TR2, TR3, the differential amplifier 71 and the Schmidt circuit 72.

A speed conversion circuit 65 applies a voltage having a magnitude dependent on the speed specified by the main control circuit 59 to a pulse oscillator 66, which generates and feeds a series of drive pulses corresponding to the specified speed to a pair of gate circuits G1 and G2. The main control circuit 59 is operative to open the gate circuit G1 to apply the train of drive pulses to the forward rotation terminal of a stepping motor drive circuit 67 connected with the stepping motor 33 as well as to the up-counting terminal of an up-down counter 62 when the wheel slide 13 is subjected to an advancing movement, and to open the gate circuit G2 to apply the train of drive pulses to the reverse rotation terminal of the drive circuit 67 and to the down-counting terminal of the up-down counter 62 when the wheel slide 13 is subjected to a retracting movement.

A momentary stop command circuit for momentarily stopping the advancing movement of the wheel slide 13 at a given position during its machining cycle is formed by a digital switch 60 and a coincidence circuit 61. The purpose of the digital switch 60 is to establish the position (point B in FIG. 5) at which the wheel slide 13 is to be stopped momentarily and to supply such information to the coincidence circuit 61. When the count in the up-down counter 62 becomes equal to the preset value established by the digital switch 60, the coincidence circuit 61 produces a coincidence signal which causes the main control circuit 59 to close the gate circuit G1, thereby providing a momentary stop of the advancing movement of the wheel slide 13. The output of the up-down counter 62 is also applied to a null determination circuit 63 and to a position indicator 64 which provides a digital display of a current position assumed by the wheel slide 13. The null determination circuit 63 operates to produce and apply a null recognition signal to the main control circuit 59.

The pulse oscillator 66 also supplies a series of drive pulses to another pair of gate circuits G3 and G4. The main control circuit 59 is also operative to open the gate circuit G3 to apply a series of drive pulses to the forward rotation terminal of a stepping motor drive circuit 68 connected with the stepping motor 51 and to the up-counting terminal of another up-down counter 69 when the engaging pieces 45a and 45b of the workpiece supporting apparatus 40 are subjected to an advancing movement, and to open the gate circuit G4 to apply the drive pulses to the reverse rotation terminal of the stepping motor drive circuit 68 and to the down-counting terminal of the up-down counter 69 when the engaging pieces 45a and 45b are subjected to a refracting movement. A null determination circuit 70 is connected with the up-down counter 69 for producing and applying to the main control circuit 59 a null recognition signal when the count in the up-down counter 69 becomes equal to null.

Figure 5:
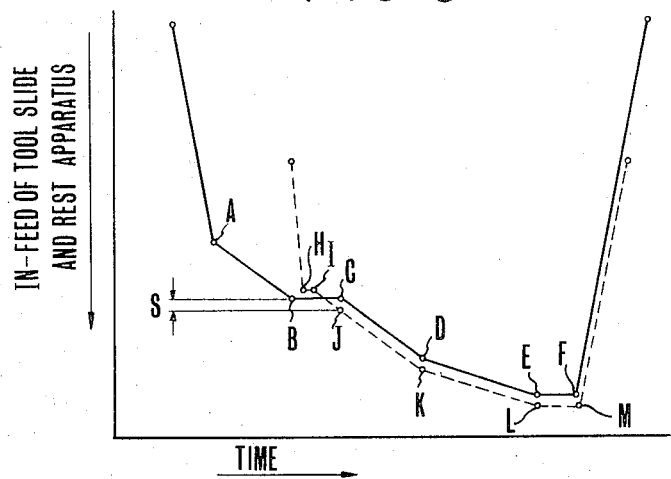
FIG. 5 is a diagram illustrating the feed cycles for the wheel slide and the engaging pieces of the rest apparatus.

The operation of the above described embodiment will be described with reference to the cycle diagram shown in FIG. 5. When the main control circuit 59 receives a start signal, a hydraulic fluid is supplied to the right-hand chamber of the rapid feed cylinder 20 to cause an advancement of the piston 21, whereby a rapid advance of the wheel slide 13 takes place through the feed screw 22 and the nut 23 until point A is reached, whereupon the limit switch LS1 is operated by the dog 25. When the limit switch LS1 is operated, the gate circuit G1 is enabled to supply a train of drive pulses from the pulse oscillator 66 to the pulse motor drive circuit 67, whereby the pulse motor 33 is driven for rotation in the forward direction to rotate the feed screw 22 through the gear train for a continued advancing movement of the wheel slide 13. The speed conversion circuit 65 sets a relatively high oscillation frequency in the pulse oscillator 66 at this time, so that the grinding wheel 14 grinds the workpiece W at a roughing feed rate. Each time a pulse is applied to the drive circuit 67, the same pulse is also applied to the up-down counter 62, thereby enabling a digital display of the current position of the wheel slide 13 by the position indicator 64. When the count in the up-down counter 62 becomes equal to a preset value in the digital switch 60, the coincidence circuit 61 produces a coincidence signal which causes the main control circuit 59 to disable the gate circuit G1, thereby providing a momentary stop (point B).

When the coincidence signal is produced by the coincidence circuit 61, the body 42 of the rest apparatus is caused by the drive from the cylinder 43 to advance toward the workpiece W (point H), and the feelers 55 and 56 of the sizing device 54 mounted on the body 42 move into abutment against the outer periphery of the workpiece W, whereby the differential transformer (not shown) contained in the sizing device 54 produces a voltage output proportional to the diameter of the workpiece W. As the body 42 advances for enough to operate the limit switch LS3, this sets a timer, not shown, which is adapted to time out after a short time interval to cause the main control circuit 59 to produce a single pulse. This pulse is applied to the gate terminal of the transistor TR1 in the memory circuit 58 to render it conductive, thereby allowing the voltage, output from the sizing device 54 to be stored in the capacitor C1.

A forced shift command signal is applied to the main control circuit 59 when the timer which as mentioned previously is set in response to the opertion of the limit switch LS3 times out, and the main control circuit 59 operates to enable the gate G3 (point I). Thereupon, a train of pulses is supplied from the pulse oscillator 66 to the stepping motor drive circuit 68 to cause a rotation of the pulse motor 51 in the forward direction and consequent rotation of the threaded shafts 48a and 48b, as driven through the gear train, whereby the sliding rods 44a and 44b are moved toward the workpiece W and the engaging pieces 45a and 45b are moved into abutment against the outer periphery of the workpiece. As the engaging pieces 45a and 45b are further driven in the forward direction, the workpiece W is caused to shifted toward the grinding wheel 14, whereby it is ground by the latter while the wheel slide 13 remains at its momentary stop. As the grinding operation proceeds while the engaging pieces 45a and 45b continue moving forwardly, the voltage output from the sizing device 54 will decrease. Such a decreasing voltage and the voltage stored across the capacitor C1 are compared in the differential amplifier 71, which produces an output corresponding to the difference therebetween and applied it to the Schmidt circuit 72. When the voltage output from the differential amplifier 71 becomes equal to a preset value, the Schmidt circuit 72 produces and applies a synchronized start command signal to the main control circuit 59 (point J). Half the value of the voltage difference corresponds to the amount of the forced shift, S.

In response to the synchronized start command signal, the main control circuit 59 operates to open the gate circuit G1, whereby the wheel slide 13 is again driven forwardly at a roughing feed rate (point C). During this phase, both of the gate circuits G1 and G3 are enabled, so that both the wheel slide 13 and the engaging pieces 45a and 45b are moved toward each other in a synchronized manner. When the rough grinding operation has proceeded to a point at which only the finishing width or thickness is left in the workpiece W, the mensuration control circuit 57 produces a fine grinding signal AS1 (points D and K). In response thereto, the main control circuit 59 specified a fine grinding feed rate and instructs the speed conversion circuit 65 accordingly. Thereupon, the voltage which is applied by the speed conversion circuit 65 to the pulse oscillator 66 is reduced in amplitude to thereby cause a reduction in the repetitive frequency of the pulses in the output train, thus forcing the wheel slide 13 and the engaging pieces 45a, 45b to be synchronously advanced at the fine grinding feed rate. When the fine grinding operation has proceeded to a point at which the workpiece W is finished to size, the mensuration control circuit 57 produces a size complete signal AS2 which causes the main control circuit 59 to close the both gate circuits G1 and G3 (points E and L), whereupon the wheel slide 13 and the engaging pieces 45a, 45b are brought to a standstill at respective positions which they assume at that time, and the workpiece W is subjected to a sparking out by the grinding wheel 14 for a definite period of time. Upon completion of the sparking out (points F and M), the main control circuit 59 operates to enable the gate circuits G2 and G4, whereby the stepping motors 33 and 51 are driven for rotation in the reverse direction, and the wheel slide 13 as well as the engaging pieces 45a and 45b are moved rearwardly or away from the workpiece W. Each time a pulse is applied to the stepping motors 33 and 51, such pulse serves to reduce the count in the up-down counters 62 and 69, and when the count in the respective counters 62 and 69 reduces to zero, the null determination circuits 63 and 70 produce a null recognition signal which causes the main control circuit 59 to disable the gate circuits G2 and G4. At the same time with the initiation of the reverse rotation of the stepping motors 33 and 51, the wheel slide 13 and the body 42 of the rest apparatus are driven rearwardly by the drive from the respective cylinders 20 and 43 until they reach the end of their retracting movement determined by the limit switches LS2 and LS4. The wheel slide 13 and the engaging pieces 45a, 45b return to their original positions, and this completes one cycle of the grinding operation.

We claim:

1. A machine tool having rest means comprising a bed; workpiece supporting means mounted on said bed; drive means for rotating a workpiece supported by said workpiece supporting means; tool slide means carrying at least one machining tool serving to machine the workpiece; first feed means for moving said tool slide means toward and away from the workpiece; rest apparatus located on the opposite side of the workpiece from the tool slide and having an engaging finger operative to support the workpiece during machining thereof; second feed means for moving said rest means toward and away from the workpiece; first control means for controlling said first and second feed means to move said tool slide means and said rest means toward and away from the workpiece; sizing device means for measuring a dimension of the workpiece and generating an output corresponding to the dimension of the workpiece; second control means for effecting a momentary stop of said tool slide means at a given moment in the course of a machining operation on the workpiece; third control means for controlling said second feed means so as to move said engaging means in a direction to the workpiece during said momentary stop through a predetermined stroke in cooperation with said sizing device means, whereby the workpiece is forcedly shifted toward said machining tool by said rest apparatus, said workpiece continuing to be machined while the tool slide means is at its momentary stop; and fourth control means for controlling a movement of said engaging finger in a direction to the workpiece synchronously with a movement of said tool slide means at a same speed with each other when said forcedly shifting movement of said engaging means and the workpiece has been completed by said third control means, whereby the machining operation on the workpiece can be performed with high accuracy independently of a wear of said engaging finger.

2. A machine tool according to claim 1 in which the forced shift of the workpiece is sufficient to cause a deflection thereof.

3. A machine tool according to claim 1 in which the first feed means includes a first hydraulic cylinder fixedly mounted on the body, a piston disposed within the first cylinder and having an axial bore extending therethrough, a feed screw extending through the bore in the piston, said feed screw being constrained from axial movement relative to the piston and being free to rotate with respect thereto, a nut depending from the tool slide and threadably engaging with one threaded end of the feed screw, a first gear secured to the other end of the feed screw, and a first stepping motor mounted on the bed and driving the first gear for rotation.

4. A machine tool according to claim 1 in which the second feed means includes a second hydraulic cylinder and a second stepping motor and wherein the rest means comprises a base secured to the bed, a body placed on the base, a slide rod receive in a bore within the body and carrying the engaging finger at its one end which extends externally of the bore and a threaded bore at its other end, and a threaded shaft rotatably journaled in the body, said threaded shaft carrying at its one end a threaded portion which threadably engages the threaded bore in the slide rod and carrying a second geat at its other end, said second stepping motor being mounted on the body for meshing engaging with the second gear.

5. A machine tool according to claim 1, further including a memory circuit for storing the output produced by the sizing means immediately after the momentary stop of the tool slide.

6. A machine tool according to claim 5 in which the fourth control means is operative to initiate the synchronized movement of the engaging finger and the tool slide toward each other when the difference between a varying output from the sizing means during the momentary stop of the tool slide means and the value stored immediately after the momentary stop of the tool slide means reaches a preset value.

7. A machine tool according to claim 3, further including a power supply for supplying a pulse train to the first stepping motor, and wherein the first control means includes a first gate connected in the path from the power supply to the first stepping motor.

8. A machine tool according to claim 4, further including a power supply for supplying a pulse train to the second stepping motor, and wherein the first control means includes a second gate connected in the path from the power supply to the second stepping motor.

9. A machine tool according to claim 7 in which the tool slide means is initially moved by a drive from the first hydraulic cylinder, followed by a drive from the first stepping motor, and wherein the drive from the first stepping motor is interrupted by the second control means which closes the first gate when the tool slide means reaches a given position.

10. A machine tool according to claim 8 in which the sizing means is carried by the rest means, and the rest means is moved by a drive from the second hydraulic cylinder until the sizing means is in a position to measure the diameter of the workpiece, said movement of the rest means being initiated in response to the momentary stop of the tool slide means, said rest means being further moved in a direction to deflect the workpiece toward the tool slide means under the control of the third control means enabling the second gate to feed the pulse train to the second stepping motor, the further movement of the rest means being interrupted by the fourth control means.

* * * * *